US008886028B2

(12) United States Patent
Lee

(10) Patent No.: US 8,886,028 B2
(45) Date of Patent: Nov. 11, 2014

(54) FLASH MODULE AND IMAGE CAPTURING SYSTEM

(75) Inventor: Hsien-Chang Lee, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 86 days.

(21) Appl. No.: 13/493,769

(22) Filed: Jun. 11, 2012

(65) Prior Publication Data

US 2013/0028585 A1    Jan. 31, 2013

(30) Foreign Application Priority Data

Jul. 29, 2011   (TW) .............................. 100127106 A

(51) Int. Cl.
*G03B 15/03*      (2006.01)
*H04N 5/222*     (2006.01)

(52) U.S. Cl.
CPC ........ *G03B 15/03* (2013.01); *G03B 2215/0507* (2013.01)
USPC ................................. 396/177; 348/371; 362/3

(58) Field of Classification Search
USPC .................. 396/155, 165, 176–178; 348/371; 362/3, 18
See application file for complete search history.

(56) References Cited

U.S. PATENT DOCUMENTS

| 6,351,609 | B1 * | 2/2002 | Hosokawa et al. | ........... 396/177 |
| 2005/0147405 | A1 * | 7/2005 | Chen | ............................. 396/177 |
| 2010/0272425 | A1 | 10/2010 | Yanagi | |

FOREIGN PATENT DOCUMENTS

| CN | 2874552 Y | 2/2007 |
| EP | 1 973 341 A1 | 9/2008 |
| EP | 2 037 321 A1 | 3/2009 |
| TW | 200909995 A | 3/2009 |
| TW | 201011451 A | 3/2010 |

\* cited by examiner

*Primary Examiner* — Rochelle-Ann J Blackman
(74) *Attorney, Agent, or Firm* — Rabin & Berdo, P.C.

(57) ABSTRACT

A flash module including a main body, a fixing base, a rotating structure, a switch and a linking structure is disclosed. The rotating structure is movably connected between the main body and the fixing base. The switch has a moving part. The linking structure is connected between the rotating structure and the moving part. The linking structure moves the moving part to an open position from a close position and rotates the rotating structure, so that the main body is moved relative to the fixing base.

20 Claims, 7 Drawing Sheets

FLASH MODULE AND IMAGE CAPTURING SYSTEM

This application claims the benefit of Taiwan application Serial No. 100127106, filed Jul. 29, 2011, the subject matter of which is incorporated herein by reference.

BACKGROUND OF THE INVENTION

1. Field of the Invention

The invention relates in general to a flash module, and more particularly to a flash module with automatic ejection function and an image capturing system.

2. Description of the Related Art

The camera normally uses a flash module to compensate the insufficient light when taking photos. Ordinary camera has an inbuilt small-sized flash module having a small volume and saving the trouble of carrying an extra flash module for the user.

The flash module is a light assistance device, and has been widely used in to provide an auxiliary light for the camera. In order to realize the function of high magnification zooming, the lens of new style cameras (such as an ordinary camera, a digital camera or a digital video camera with advanced system) is correspondingly increased. However, the performance of the inbuilt flash module is not satisfactory. As the optical viewfinder (OVF) has gradually been replaced by the electronic viewfinder (EVF), the design of camera is directed towards miniaturization, and the structural space of the camera is further reduced. Under such circumstances, a hidden flash module which is ejected when in use has become a prominent task for the industries.

SUMMARY OF THE INVENTION

The invention is directed to a flash module and an image capturing system. With the cooperation of a rotating structure, a linking structure and a switch, the main body of the flash module inside the camera is moved relative to the fixing base so that the flash light is activated.

According to an embodiment of the present invention, a flash module including a main body, a fixing base, a rotating structure, a switch and a linking structure is disclosed. The rotating structure is movably connected between the main body and the fixing base. The switch has a moving part. The linking structure is connected between the rotating structure and the moving part. The linking structure moves the moving part to an open position from a close position to rotate the rotating structure, so that the main body is moved relative to the fixing base.

According to another embodiment of the present invention, an image capturing system including a flash module, a detection unit and a control center is disclosed. The flash module includes a main body, a fixing base, a rotating structure, a switch and a linking structure. The detection unit receives an ambient light beam. The control center is electrically connected to the detection unit, and used to calculate an ambient brightness of the ambient light beam. When the ambient brightness is lower than a predetermined value, the control center emits a control signal for the linking structure moving the moving part to an open position from a close position to rotate the rotating structure.

According to an alternate embodiment of the present invention, an image capturing system including a flash module, a detection unit, a position sensor and a control center is disclosed. The flash module includes a main body, a fixing base, a rotating structure, a switch and a linking structure. The detection unit receives an ambient light beam. The position sensor detects a position of the main body and outputs a position signal. The control center, electrically connected to the detection unit and the position sensor, receives the position signal and calculates an ambient brightness of the ambient light beam. When the ambient brightness is lower than a predetermined value, the control center determines whether to emit a control signal according to the position signal, and the linking structure moves the moving part to an open position from a close position for rotating the rotating structure.

The above and other aspects of the invention will become better understood with regard to the following detailed description of the preferred but non-limiting embodiment(s). The following description is made with reference to the accompanying drawings.

DETAILED DESCRIPTION OF THE INVENTION

The present embodiment discloses a flash module. With the cooperation of a rotating structure, a linking structure and a switch (such as an electromagnetic actuator), the main body of the image capturing system with image capturing function is moved relative to the fixing base to activate the flash light. The image capturing system, such as a camera, a video recorder, a mobile communication device and a portable data processor, is exemplified by a camera in the present embodiment. However, the invention is not restricted by such exemplification. The rotating structure includes a rotational arm, a fixing shaft and a rotational arm spring, and is movably connected between the main body and the fixing base. The switch has a moving part which is fastened inside the switch by a magnetism of the switch. When the camera receives a signal for activating a flash light, the switch is instantaneously electrified to generate an electromagnetic field which offsets the magnetism of the switch and makes the moving part no more attracted by magnetism and is accordingly detached from the switch. The linking structure is connected between the rotating structure and the moving part. When the moving part is no more restricted by the magnetism, the linking structure moves the moving part to an open position from a close position and rotates the rotating structure, so that the main body is moved relative to the fixing base.

A number of embodiments are disclosed below for elaborating the invention. However, the embodiments of the invention are for detailed descriptions only, not for limiting the scope of protection of the invention.

Figure 1A:
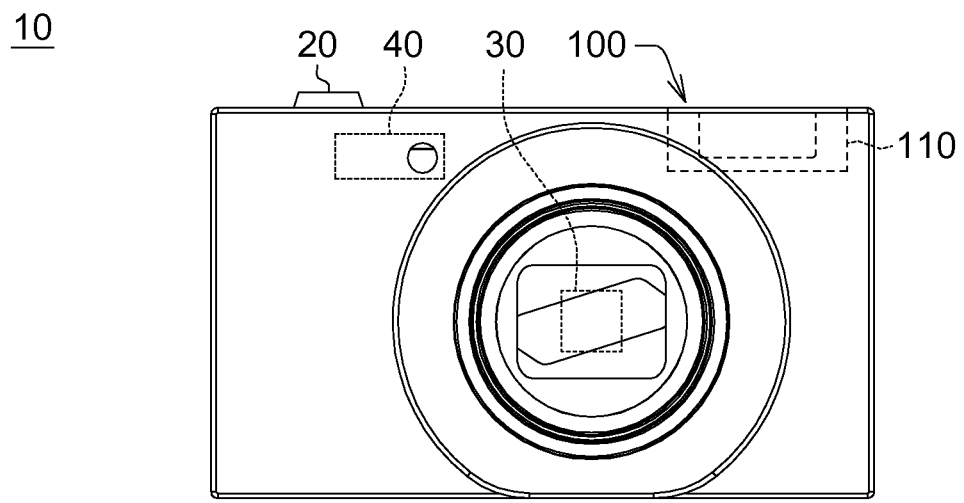
FIG. 1A shows an appearance view of a camera.
Figure 1B:
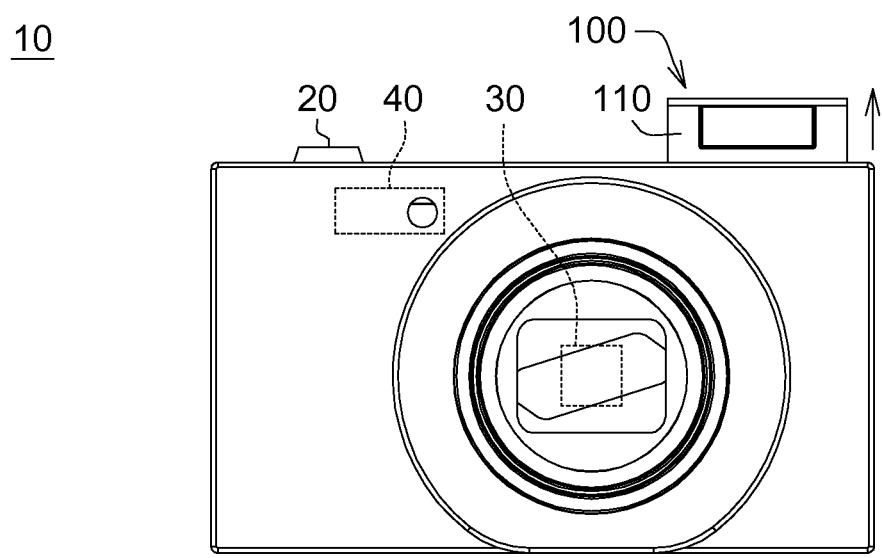
FIG. 1B shows a main body inside a camera being ejected.

Referring to FIG. 1A~1B and FIG. 2A~2D. FIG. 1A shows an appearance view of a camera. FIG. 1B shows a main body inside a camera being ejected. FIGS. 2A~2D respective show the movements of a flash module according to an according of the invention.

As indicated in FIGS. 1A and 1B, when the user slightly presses the camera button 20, the detection unit 30 and the control center 40 of the camera 10 detects an ambient brightness of an ambient light and determines whether to activate the flash light when taking photos. If it is determined that the ambient brightness is too low, then the flash module 100, as indicated in FIG. 1B, performs a series of actions to eject the main body 110 and activate the flash light when the user really presses the camera button 20. The detection unit 30 may be activated by an inbuilt firmware or by a manual man-machine interface (such as button or touch screen), and the invention is not limited thereto. The detection unit, such as an image sensor, receives an ambient light through the preview mode of the image sensor. The control center calculates the ambient brightness of the sensed ambient light and estimates whether the ambient brightness is too low. The image sensor, such as a charge coupled device (CCD) or a complementary metal-oxide-semiconductor (CMOS), forms a preview image after receiving the ambient light. The detection unit may also be realized by a photoelectric sensor disposed on the camera 10.

Figure 2A:
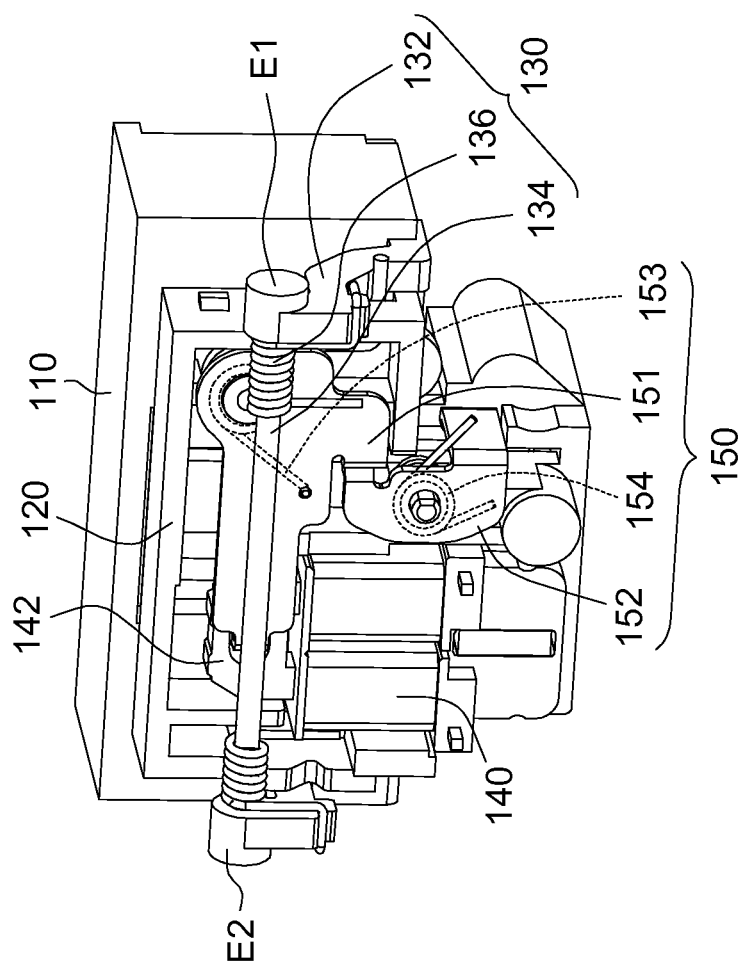
FIGS. 2A~2D respective show the movements of a flash module according to an according of the invention.
Figure 2B:
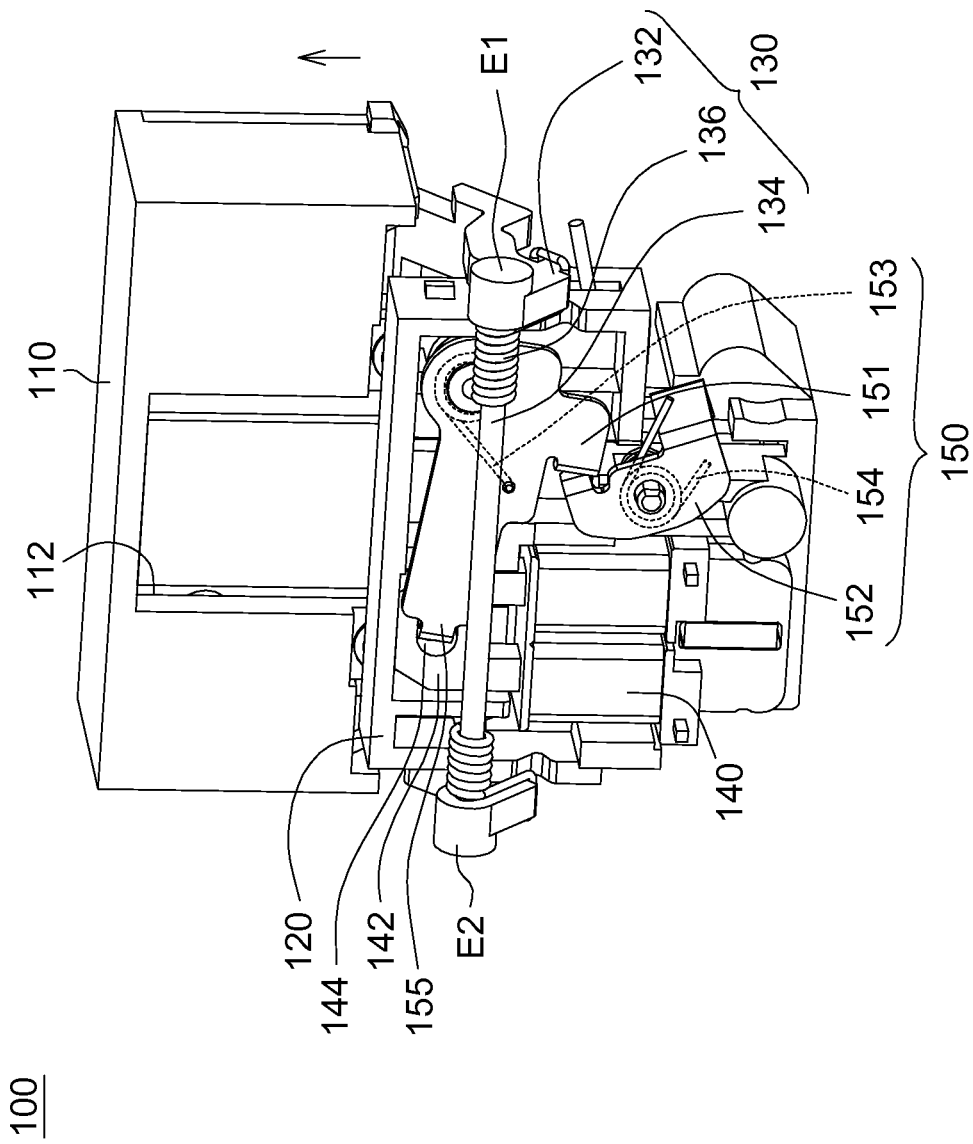

In the part of the image capturing system disclosed above, the detection unit 30 is electrically connected to the flash module 100 by the control center 40 inside the camera 10. When the ambient brightness is lower than a predetermined value, the control center 40 emits a control signal, so that the main body 110 is moved to the open position. As indicated in FIGS. 2A and 2B, the flash module 100 includes a main body 110, a fixing base 120, a rotating structure 130, a switch 140 and a linking structure 150. The rotating structure 130 is movably connected between the main body 110 and the fixing base 120. The rotating structure 130 includes a rotational arm 132, a fixing shaft 134 and two rotational arm springs 136. The fixing shaft 134 has two ends E1 and E2. The rotational arm 132 is mounted on the two ends E1 and E2 of the fixing shaft 134 and rotates around the fixing shaft 134. The rotational arm springs 136 are disposed on the two ends of the fixing shaft 134, and provides a rotational force for the rotational arm 132 to drive the main body 110 to be moved relative to the fixing base 120 and ejected upward as indicated in FIG. 2B. The rotational arm spring 136 includes at least one torsion spring. The quantity of torsion spring is at least one and is not restricted in the invention.

The switch 140, such as an electromagnetic actuator, has a moving part 142, such as a metal piece or a magnetic/iron object. The linking structure 150 is connected between the rotating structure 130 and the moving part 142. The linking structure 150 includes a first rotary clasp 151, a second rotary clasp 152, a first clasp spring 153 (denoted in dotted lines) and a second clasp spring 154 (denoted in dotted lines). The moving part 142 has an opening 144. The first rotary clasp 151 has a hook 155 which buckles the moving part 142 through the opening 144. The first clasp spring 153 and the second clasp spring 154 respectively include at least one torsion spring. The quantity of torsion spring is at least one and is not restricted in the invention.

Referring to FIG. 1A and FIG. 2A. The moving part 142 is attracted by the magnetism and becomes fastened inside the switch 140. When the flash module 100 is still and received in the camera 10, the second rotary clasp 152 disposed under the first rotary clasp 151 abuts the first rotary clasp 151 and is engaged with the main body 110. Therefore, the main body 110 is restricted by the rotating structure 130 and cannot be ejected upward.

As indicated in FIG. 2B, when the switch 140 is instantaneously electrified to generate an electromagnetic field which offsets the original magnetism and makes the moving part 142 is no more attracted by the magnetism inside the switch 140. The first clasp spring 153 extends outward and applies a releasing torque onto the first rotary clasp 151 to rotate the first rotary clasp 151 upward. The first rotary clasp 151 moves the moving part 142 to the open position (referring to FIG. 2B) from the close position (referring to FIG. 2A). In addition, the first rotary clasp 151 rotates the second rotary clasp 152 to be detached from the main body 110 and makes the main body 110 released accordingly. Thus, the main body 110 is ejected upward due to the operations of the rotational arm 132 and the rotational arm spring 136 of the rotating structure 130.

To put it in greater details, the main body 110 and the fixing base 120 may slide to each other through the use of a groove 112, so that the main body 110, when ejected, can only move upward/downward but not forward/backward or left-ward/right-ward.

Figure 2C:
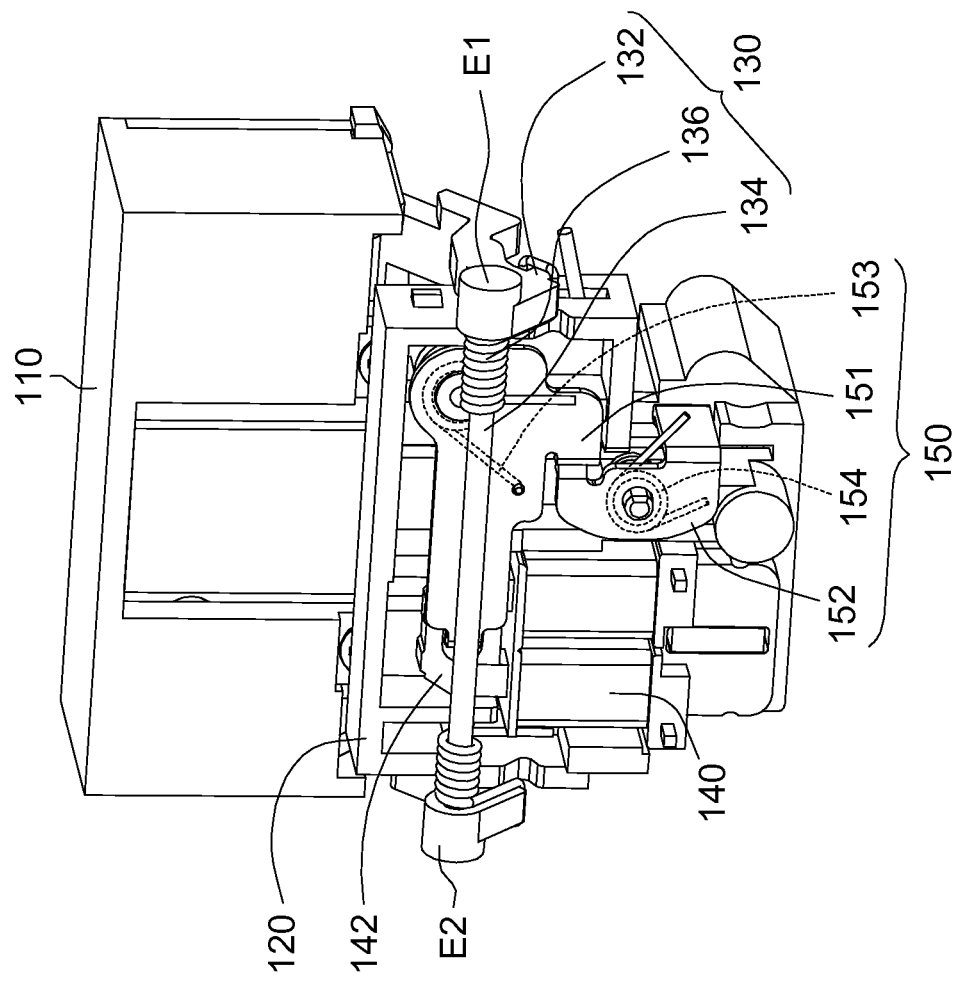

Referring to FIG. 1B and FIG. 2C. After the main body 110 is ejected, the torque of the first clasp spring 153 is completely released, and the second clasp spring 154, whose torque is gradually increased due to the increase in the amount of compression, applies a restoring torque onto the second rotary clasp 152. When the restoring torque is greater than the releasing torque, the second rotary clasp 152 rotates the first rotary clasp 151 in an inverse direction to restore the original position, and the first rotary clasp 151 moves the moving part 142 to the close position from the open position. Meanwhile, the electromagnetic field disappears because the switch 140 is no longer electrified. Therefore, the moving part 142 is attracted by the magnetism and becomes fastened in the switch 140.

Figure 2D:
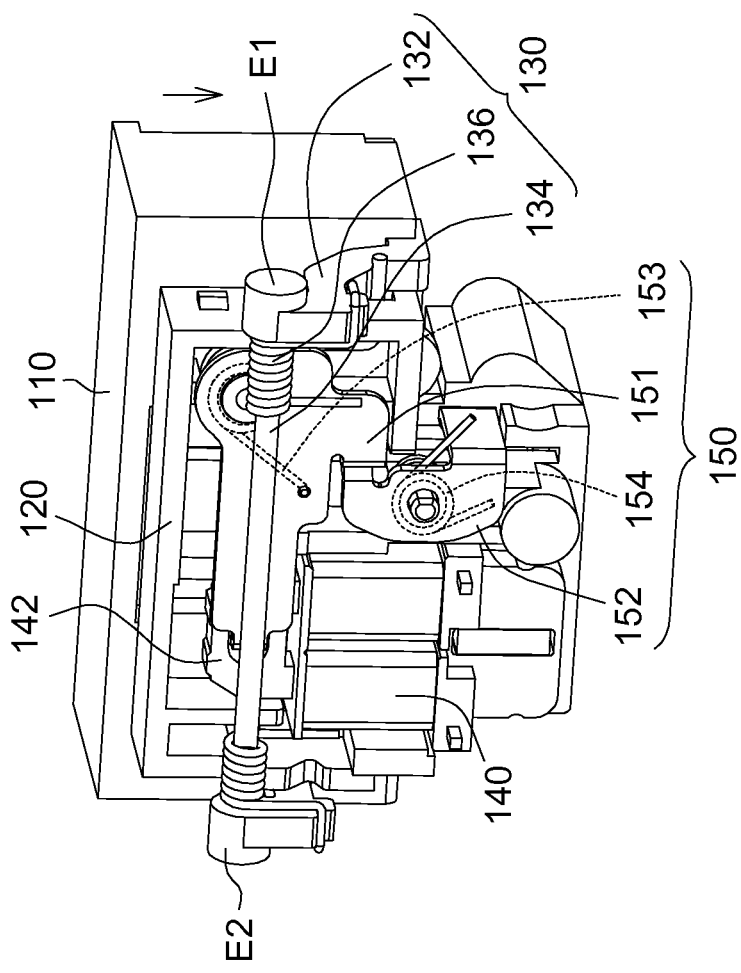

As indicated in FIG. 2D, when the user is not using the flash light, the user only needs to presses the main body 110. When the main body 110 reaches the predetermined position, the main body 110 is engaged with the second rotary clasp 152 and cannot be activated. Meanwhile, the first clasp spring 153 being pressed downwardly by the rotational arm 132 returns to the original position to generate a predetermined torque to be used next time.

Figure 3A:
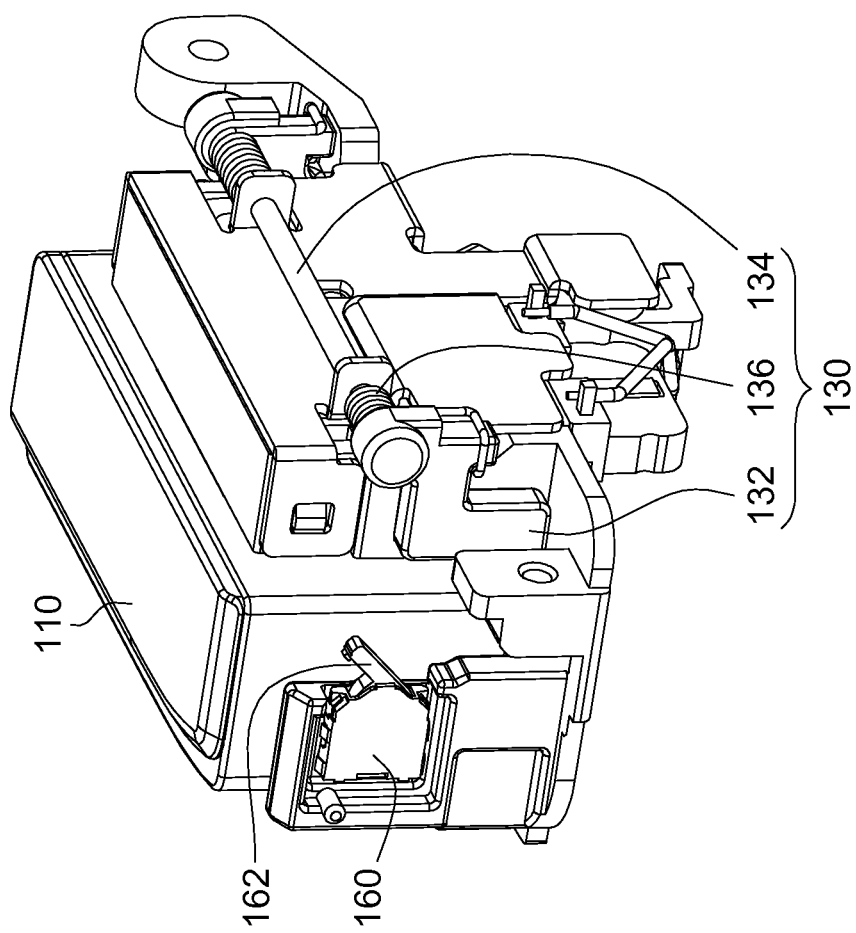
FIGS. 3A and 3B respectively show a flash module according to an according of the invention.
Figure 3B:
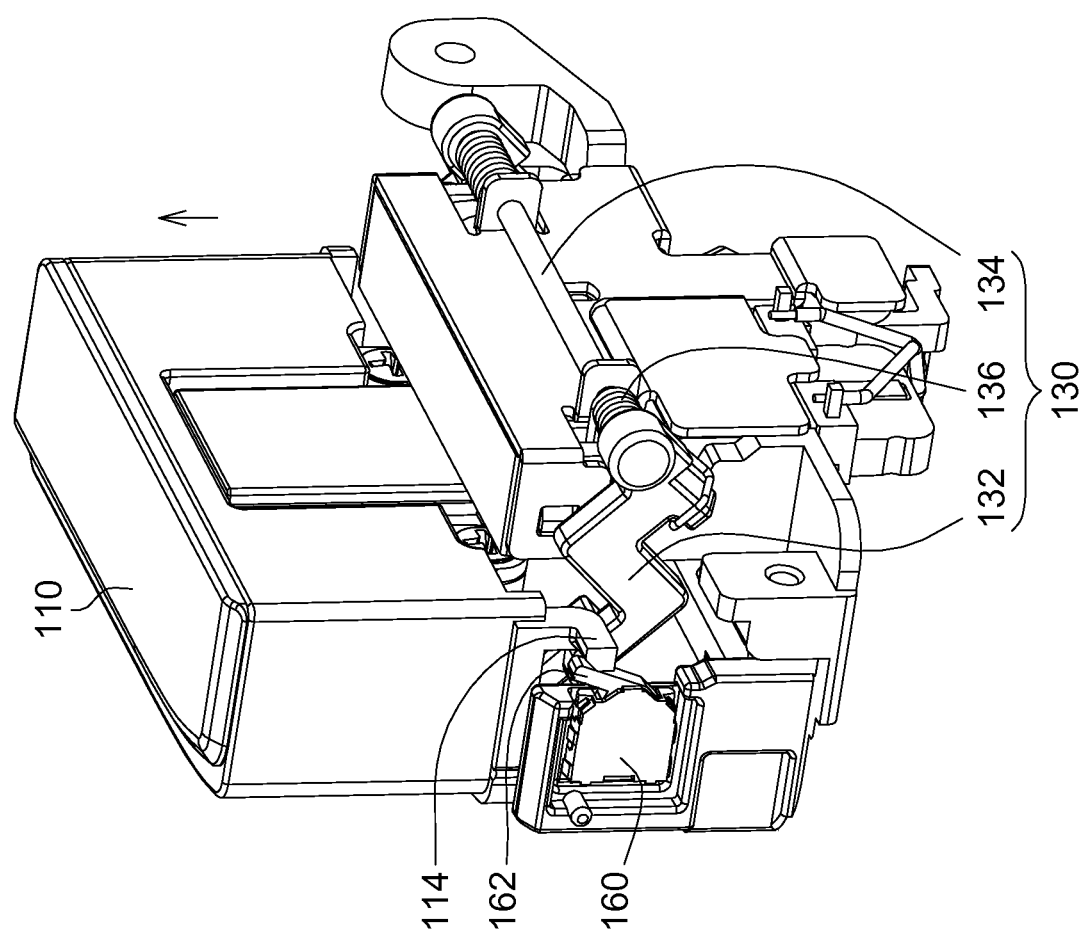

Referring to FIGS. 3A and 3B, schematic diagrams of a flash module according to an according of the invention are respectively shown. In the present embodiment, the flash module 100 further includes a position sensor 160, which is adjacent to one side of the main body 110 and electrically connected to the control center 40 (referring to FIG. 1A). The position sensor 160, including a lever 162, senses the position of the main body 110 and emits a position signal to the control center 40. When the detection unit 30 previews the image to receive an ambient light whose brightness is lower than a predetermined value, the control center 40 determines whether the main body 110 reaches the predetermined position according to the position signal. If the main body 110 has not yet reached the predetermined position, then the control center 40 emits a control signal, so that the linking structure 150 (referring to FIG. 2A) moves the moving part 142 to an open position from a close position and rotates the rotating structure 130. The main body 110 has a flange 114. When the main body 110 is moved upward by the rotating structure 130, the flange 114 toggles and moves the lever 162 to the toggling position of FIG. 3B. Thus, the control center 40 determines whether the main body 110 is moved to the predetermined position according to the position signal emitted by the position sensor 160. The position sensor 160 may be realized by a trigger piece or an electronic trigger component apart from the lever 162. Moreover, the main body 110 may also be manually controlled by the user, so that when the switch 140 is instantaneously electrified, the moving part 142 is released and the main body 110 is activated accordingly. The invention is not limited thereto.

The flash module and the image capturing system disclosed in above embodiments of the invention may be used in a camera or an electronic device with image capturing function. The main body may be moved upward and downward, so that when the main body is ejected, no external object will fall into the camera and no will the ejected main body interfere with the high magnification lens. Beside, the main body, when not used by the flash light, may be received in the camera to avoid collision and damage.

While the invention has been described by way of example and in terms of the preferred embodiment(s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. A flash module, comprising:
    a main body;
    a fixing base;
    a rotating structure movably connected between the main body and the fixing base;
    a switch having a moving part; and
    a linking structure connected between the rotating structure and the moving part, wherein the linking structure moves the moving part to an open position from a closed position to rotate the rotating structure,
    wherein the rotating structure abuts against a bottom of the main body and pushes the main body to pop up linearly.

2. The flash module according to claim 1, wherein the linking structure comprises:
    a first rotary clasp connecting the moving part; and
    a second rotary clasp abutting the first rotary clasp and engaged with the main body.

3. The flash module according to claim 2, wherein the linking structure further comprises:
    a first clasp spring applying a releasing torque onto the first rotary clasp, while the first rotary clasp moves the moving part to the open position, the second rotary clasp is rotated to release the flash module; and
    a second clasp spring used to apply a restoring torque, wherein when the restoring torque is greater than the releasing torque, the second rotary clasp rotates the first rotary clasp in an inverse direction and the first rotary clasp restores the moving part to the close position.

4. The flash module according to claim 3, wherein each of the first clasp spring and the second clasp spring comprises at least one torsion spring.

5. The flash module according to claim 1, wherein the rotating structure comprises:
    a rotational arm;
    a fixing shaft connecting the rotational arm; and
    a plurality of the rotational arm springs disposed on the fixing shaft.

6. The flash module according to claim 5, wherein each of the rotational arm springs comprises at least one torsion spring.

7. The flash module according to claim 1, further comprising a position sensor detecting a position of the main body.

8. The flash module according to claim 7, wherein the position sensor comprises a lever, and the main body comprises a flange which toggles the lever to generate a position signal.

9. An electronic device, comprising the flash module claimed in claim 1.

10. An image capturing system, comprising:
    a flash module, comprises:
        a main body;
        a fixing base;
        a rotating structure movably connected between the main body and the fixing base;
        a switch having a moving part; and
        a linking structure connected between the rotating structure and the moving part, wherein the linking structure moves the moving part to an open position from a close position to rotate the rotating structure, wherein the rotating structure abuts against a bottom of the main body and pushes the main body to pop up linearly;
    a detection unit receiving an ambient light; and
    a control center electrically connected to the detection unit and used to calculate an ambient brightness according to the ambient light;
    wherein, when the ambient brightness is lower than a predetermined value, the control center emits a control signal for the linking structure moving the moving part to an open position from a close position to rotate the rotating structure.

11. The image capturing system according to claim 10, wherein the detection unit comprises an image sensor.

12. The image capturing system according to claim 10, wherein the linking structure comprises:
    a first rotary clasp connecting the moving part; and
    a second rotary clasp abutting the first rotary clasp and engaged with the main body.

13. The image capturing system according to claim 12, wherein the linking structure further comprises:
    a first clasp spring applying a releasing torque onto the first rotary clasp, while the first rotary clasp moves the moving part to the open position, the second rotary clasp is rotated to release the flash module; and
    a second clasp spring applying a restoring torque onto the second rotary clasp, wherein when the restoring torque is greater than the releasing torque, the second rotary clasp rotates the first rotary clasp in an inverse direction and the first rotary clasp restores the moving part to the close position.

14. The image capturing system according to claim 13, wherein each of the first clasp spring and the second clasp spring comprises at least one torsion spring.

15. The image capturing system according to claim 10, wherein the rotating structure comprises:
    a rotational arm;
    a fixing shaft connecting the rotational arm; and
    a plurality of rotational arm springs disposed on the fixing shaft.

16. The image capturing system according to claim 10, further comprising a position sensor having a lever, wherein the main body comprises a flange which toggles the lever to generate a position signal of the main body.

17. An image capturing system, comprising:
    a flash module, comprising:
        a main body;
        a fixing base;
        a rotating structure movably connected between the main body and the fixing base;
        a switch having a moving part; and
        a linking structure connected between the rotating structure and the moving part, wherein the linking structure moves the moving part to an open position from a close position to rotate the rotating structure, wherein the rotating structure abuts against a bottom of the main body and pushes the main body to pop up linearly;
    a detection unit receiving an ambient light beam;
    a position sensor detecting the position of the main body and outputting a position signal; and a control center electrically connected to the detection unit and the position sensor to receive the position signal and calculating an ambient brightness according to the ambient light;

wherein, when the ambient brightness is lower than a predetermined value, the control center determines to emit a control signal according to the position signal, and the linking structure moves the moving part to an open position from a close position for rotating the rotating structure.

18. The image capturing system according to claim 17, wherein the detection unit comprises an image sensor.

19. The image capturing system according to claim 17, wherein the linking structure comprises:
   a first rotary clasp connecting the moving part; and
   a second rotary clasp abutting the first rotary clasp and engaged with the main body;
   a first clasp spring applying a releasing torque onto the first rotary clasp, while the first rotary clasp moves the moving part to the open position, the second rotary clasp is rotated to release the flash module; and
   a second clasp spring applying a restoring torque onto the second rotary clasp, wherein when the restoring torque is greater than the releasing torque, the second rotary clasp rotates the first rotary clasp in an inverse direction and the first rotary clasp restores the moving part to the close position.

20. The image capturing system according to claim 17, wherein the rotating structure comprises:
   a rotational arm;
   a fixing shaft connecting the rotational arm; and
   a plurality of rotational arm springs disposed on the fixing shaft.

* * * * *